United States Patent [19]

Yamamoto et al.

[11] Patent Number: 4,865,675
[45] Date of Patent: Sep. 12, 1989

[54] PROCESS OF AND APPARATUS FOR HOT PRESSURE ADHESION TREATMENTS

[75] Inventors: Mayumi Yamamoto; Eiichi Suzuki; Yoshitaka Watanabe, all of Tokyo, Japan

[73] Assignee: Canon Kabushiki Kaisha, Tokyo, Japan

[21] Appl. No.: 100,360

[22] Filed: Sep. 23, 1987

[30] Foreign Application Priority Data

Sep. 25, 1986 [JP] Japan ............................ 61-224812
Sep. 25, 1986 [JP] Japan ............................ 61-224813

[51] Int. Cl.⁴ ............... B29C 55/06; B29C 71/00; B32B 31/08
[52] U.S. Cl. ............................ 156/164; 100/52; 100/93 RP; 100/176; 156/324; 156/361; 156/378; 156/495; 156/583.1; 264/40.2; 264/171; 264/288.4; 264/294; 264/342 RE; 264/345; 425/135; 425/145; 425/163; 425/343; 425/363
[58] Field of Search ........... 264/40.2, 171, 288.4, 264/294, 342 RE, 345, 346; 425/135, 145, 163, 343, 363, 383, 445; 156/64, 164, 324, 344, 361, 378, 495, 555, 580, 583.1, 584; 100/52, 93 RP, 176

[56] References Cited

U.S. PATENT DOCUMENTS

| | | | |
|---|---|---|---|
| 3,619,332 | 11/1971 | Huls | 425/343 X |
| 3,734,994 | 5/1973 | Blecha | 264/288.4 |
| 4,124,431 | 11/1978 | Schramer et al. | 264/345 X |
| 4,501,797 | 2/1985 | Super et al. | 264/288.4 X |
| 4,501,798 | 2/1985 | Koschak et al. | 264/288.4 X |
| 4,639,341 | 1/1987 | Hanamoto et al. | 264/40.2 X |

*Primary Examiner*—Jeffery Thurlow
*Assistant Examiner*—Leo B. Tentoni
*Attorney, Agent, or Firm*—Fitzpatrick, Cella, Harper & Scinto

[57] ABSTRACT

A hot press device has a pair of hot press rollers for heating and pressing a treatment object therebetween while rotating, and pairs of delivery rollers are arranged before and after the pair of hot press rollers. The treatment object passes back and forth through the pair of hot press rollers, and a controller controls the delivery rollers so that the circumferential speeds of the respective delivery rollers located downstream in the forward or reverse passing direction of the treatment object can be increased.

8 Claims, 3 Drawing Sheets

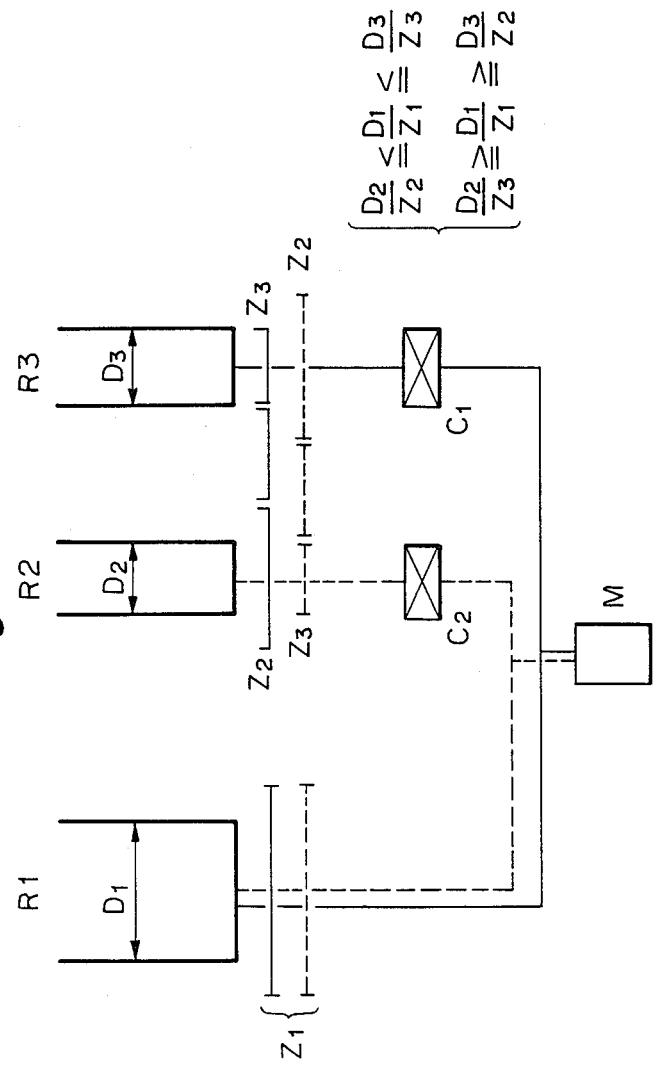

PROCESS OF AND APPARATUS FOR HOT PRESSURE ADHESION TREATMENTS

BACKGROUND OF THE INVENTION

1. Field of the Invention

This invention relates to a hot press device which heat presses a treatment object such as a sheet, etc., and, more specifically to a hot press device which can be suitably used for lamination treatment of a printed matter (print) formed by recording an image on paper, etc. by a recording method using recording liquid, in, for example an ink jet recording method, and also to a hot pressure adhesion treatment process by use thereof.

2. Related Background Art

The ink jet recording method is a method of recording in which small droplets of a recording liquid are attached from the orifice of a recording head onto a recording medium such as paper, etc. The method is attracting attention as the recording method capable of performing high speed recording, and full-color image recording with little noise and without requiring a special fixing treatment.

The recording liquid to be used in the ink jet recording is generally formed of a recording agent, primarily a dye, etc., with water or a mixture of water and various solvents as the solvent therefor.

In such an ink jet recording method in which an aqueous recording liquid is used, the recording medium to be used for recording must be excellent in absorption and stability of the recording liquid. Above all, in multi-color ink jet recording using recording liquids of two or more colors, because of the increased amount of the recording liquid emitted onto the recording medium, it must be particularly good in absorption and stability of the recording liquid.

A recording medium excellent in such characteristics has been known which has a receiving layer for recording liquid comprising a porous material good in absorption and stability of recording liquid provided on a substrate such as paper, etc.

On the other hand, a recording medium having a porous receiving layer for recording liquid involves the drawback that it lacks gloss on the recording medium surface, whereby even a sharply recorded image may be inferior in sharpness of the image when observed with eyes. This has been a problem to be solved particularly in forming a color print by recording a mult-color image according to the ink jet recording method.

To cope with this problem, it has been practiced to give gloss to the print by lamination treatment of the recorded surface with a film after an image was formed on the recording paper with a recording liquid.

Among such lamination treatments, the one employing a peel-off transfer type lamination film has such a specific feature that storage of lamination film is simple and its handling is also easy, etc. Generally speaking, a lamination film material comprising a transfer material composed mainly of a thermoplastic resin such as an acrylic resin, a polystyrene resin, a polyester resin, a polyethylene resin, etc. peelably provided on a substrate such as paper, cloth, plastic, etc. is closely contacted onto the image forming surface to be pressure-adhered, followed by separation of the substrate, thereby permitting the transfer material to remain on the above recording medium to impart gloss to the recorded surface.

In the prior art, laminators to be used for lamination treatment have been constituted only of a hot press roller pair and a guide roller pair.

When a laminated product comprising only a lamination film and a print with different thermal shrinkages is treated by use of such a laminator, the laminated product will be extremely curled in the laminator after hot pressing, with the result that the laminated product may be wound around rollers or generate wrinkles, and having the drawbacks of jamming and unstable lamination done in a stable manner.

In the lamination device of the prior art, for simplification of the device structure, the insertion inlet for treatment objects and the paper discharging outlet are provided separately, and therefore separate spaces for insertion and discharging are required before and after the main device, to involve the problem that the installation site is restricted.

SUMMARY OF THE INVENTION

An object of the present invention is to provide a novel hot press device for performing lamination treatment stably by treating a treatment object having members with different thermal shrinkage factors laminated on one another, while preventing generation of curl, wrinkle of the treatment object and preventing generation of jamming in the device, and also a hot pressure adhesion treatment process by use thereof.

Another object of the present invention is to provide a hot press device excellent in operation of lamination treatment where a base film of the lamination film can easily be peeled off after lamination in laminating a print by use of a peel-off transfer type lamination film, and a hot pressure adhesion treatment process by use thereof.

Still another object of the present invention is to provide a hot press device which is made compact and will not be restricted in installation space.

According to an aspect of the present invention, a hot press device having a pair of hot press rollers for heating and pressing a treatment object therebetween while rotating and pairs of delivery rollers arranged before and behind said pair of hot press rollers; said treatment object passing back and forth through said pair of hot press rollers, and a control means for controlling said roller pairs being provided so that the circumferential speeds of the respective roller pairs may be made sequentially higher in passing directions of said treatment object in both forward and backward passes.

According to another aspect of the present invention, there is provided a hot press device having a pair of hot press rollers for heating and pressing a treatment object therebetween while rotating and pairs of delivery rollers arranged before and behind said pair of hot press rollers; said treatment object passing back and forth through said pair of hot press rollers, sensors being provided to detect the position thereof in said device, and a control means for controlling said roller pairs being provided so that the circumferential speeds of the respective roller pairs may be made sequentially higher in passing direction of said treatment object in both forward and backward passes in accordance with detection of said sensors.

According to a further aspect of the present invention, there is provided a process for hot pressure adhesion treatment of a treatment object comprising members with different coefficients of thermal expansion laminated on one another, comprising a step of applying tension on said material to be treated and a step of performing heating treatment of said treatment object for a plural number of times.

BRIEF DESCRIPTION OF THE DRAWINGS

FIG. 3 is a diagram for illustrating schematically the roller driving systems of the hot press device of the present invention.

DETAILED DESCRIPTION OF THE PREFERRED EMBODIMENTS

The hot press device of the present invention heats a treatment object passing back and forth and therefore is good in thermal efficiency, and also good in operability, because the treatment object comes back by reciprocation. Further, due to the difference in circumferential speed between the rollers, tension is kept applied on the treatment object, whereby no wrinkle is formed and jamming will hardly occur.

The circumferential speed of the above respective roller pairs is set so that it may be sequentially greater in the passing direction of the treatment object. This means that the circumferential speed of the roller pairs on the passing direction side of the treatment object is set greater than the circumferential speed of the roller pairs on the opposite side opposite to the passing direction in the device.

Figure 1:
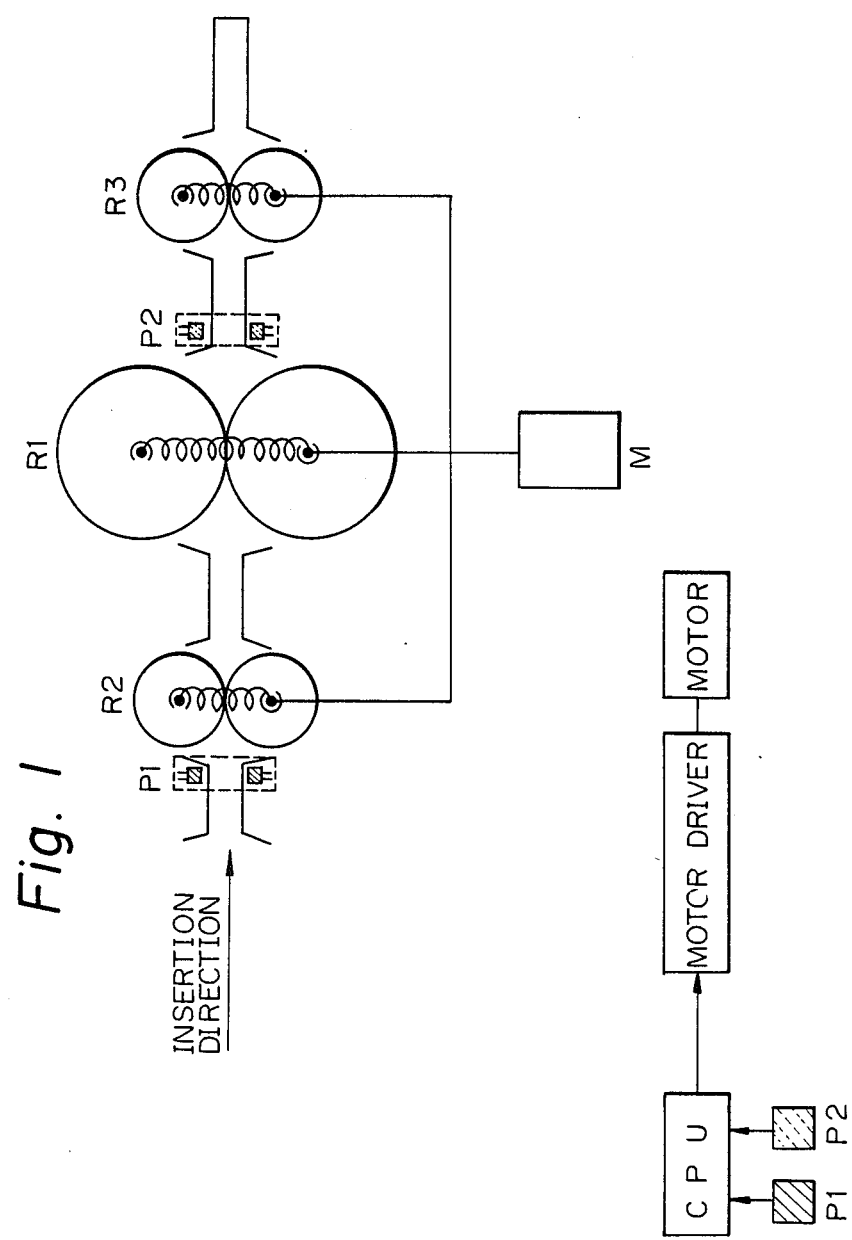
FIG. 1 is a schematic illustration of the hot press device of the present invention.

FIG. 1 shows schematically an example of the hot press device of the present invention.

In the Figure, R1 is a pair of hot press rollers made of a stainless steel with a radius of 15 mm having a halogen heater built therein, and also having a heating means not shown. Each of R2 and R3 is a pair of delivery rollers with a radius of 10 mm, and arranged at a center-to-center distance of 60 mm from the hot press roller pair. M is a motor for rotating the roller pairs R2, R1 and R3, and P1, P2 are optical sensors for detecting passage of the treatment object.

In this device, when a treatment object comprising a lamination film having a transfer material arranged on a substrate and a print product superposed thereon is inserted from the roller pair R2 in the insertion direction, insertion of the treatment product is detected by the optical sensor P1, whereby the roller driving system is actuated by the microcomputer control constituting the control means as mentioned in the present invention and the respective rollers are rotated in the insertion direction. When the treatment object passes through the hot press roller R1, the lamination film is pressed under heating against the print product to be pressure adhered onto the print product. Further, when the laminated product is delivered and completion of the passage is detected by the sensor P2, the forward step has been completed, whereupon the roller driving system is controlled by the microcomputer to reverse the rotation of the motors, whereby the rotational direction of the respective rollers is reversed. The laminated product is sent back by passing through the hot press roller pair to the insertion position as the backward step, thus completing one cycle of reciprocation of the laminated product. In the above backward step, during passage through the hot press roller pair R1, adhesion of the lamination film onto the print product is completely effected, and thereafter the substrate of the lamination film is peeled off to complete lamination treatment of the print product.

As described above, in the hot press device of the present invention, the treatment object is constantly subjected to tension and is free from generation of curl and wrinkle, because the circumferential speed of the rollers in the passing direction of the treatment object is made sequentially greater, and also by providing double heating steps, adhesiveness between the lamination film and the print can be sufficiently enhanced, whereby the substrate of the laminate can be easily peeled off from the print. Further, for example, by the action of the sensor as described above, the treatment object is returned back after treatment automatically to the place at which it was inserted, and therefore the operation is easy and simple. By detection of initiation and completion of passage of the treatment object by sensors, the positional relationship between the treatment object and the roller pair can be determined correctly even when the lengths of the treatment object differ respectively and times for passing of the object through the roller pair are different.

As the sensor to be used in the device of the present invention, a transmission type visible light interruptor is preferred. In the transmission type visible light interruptor, light is once intercepted when the treatment object passes over the light emission device LED, and then after passage of the film is again received by the phototransistor which is the light receiving device, whereby passage of the treatment object can be detected.

Figure 2:
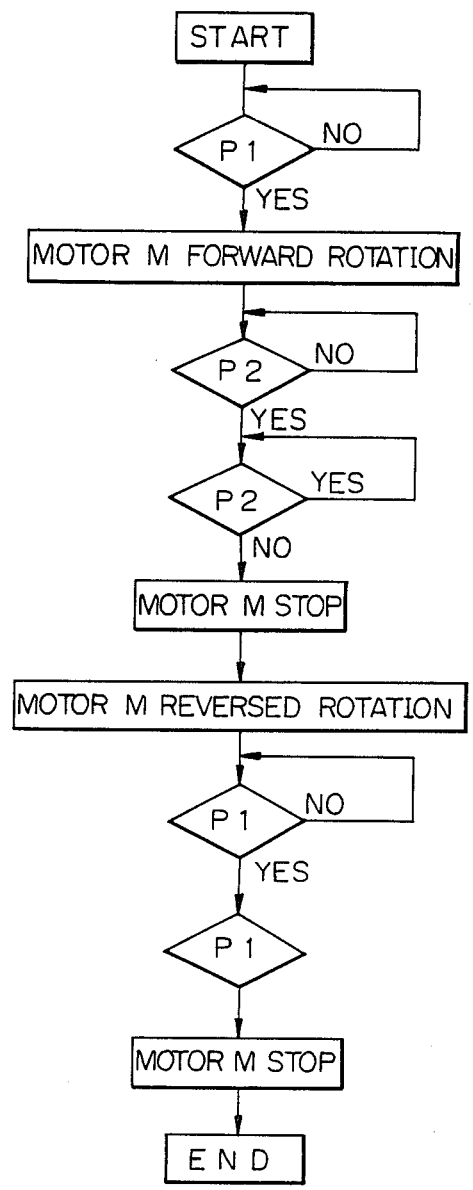
FIG. 2 is a flow chart of the automatic control system for actuating the hot press device of the present invention.

FIG. 2 shows a flow chart showing the steps in which the control means controls rotation of the motor and the rotational direction corresponding to the information from by the sensors.

When light is intercepted from the LED of the sensor P1 by insertion of the treatment object, the motor M is actuated to initiate rotation of the rollers to deliver the treatment object in the insertion direction, whereby the treatment object passes through rollers R2, R1, to intercept once the light from the LED of the sensor P2, and when light is again received by the phototransistor, the motor stops for a while. Immediately thereafter, the motor rotates in the reverse direction. Again, the treatment object passes through the roller R2 and light interception and light receiving are repeated between the LED of the sensor P1 and the phototransistor, whereby the motor stops.

FIG. 3 shows the driving systems for the respective roller pairs in this device.

The hot press roller pair R1 is connected directly to the motor at a gear ratio of Z1 and rotates constantly at the same speed. The delivery roller pairs R2, R3 and the motor M are linked by known one directional clutches C1, C2 in the manner as shown by the solid line for the forward step for movement in the inserted direction, having mechanisms to transmit rotation of the motor M at respective gear ratios of Z2, Z3. On the other hand, in the backward step, by change-over of the clutches C1, C2, the respective rollers are linked to the motor in the manner shown by the broken line, and the gear ratios of the rollers R2, R3 are reversed from the case of the going way to become Z3, Z2, respectively. The control means as mentioned in the present invention is constituted of the connection system of these gears and clutches and the microcomputer which controlls the rotation of rollers and the rotational direction as described above. Now, the respective diameters of the rollers R1, R2, R3 are defined as D1, D2 and D3, and these are set constantly as follows:

$$D2/Z2 \leqq D1/Z1 \leqq D3/Z3 \text{ (forward step)}$$

$$D2/Z3 \geqq D1/Z1 \geqq D3/Z2 \text{ (backward step)}$$

and then, the circiumferential speed will be made sequentially greater in the downstream direction which is the passing direction of the treatment object in either the case of going way or coming way. Hence, in the forward and backward steps as described above, since the laminated product having a lamination film adhered onto a print product is constantly drawn toward the downstream side, curl and wrinkle will be generated difficultly and jamming will not be caused.

In the present invention, the difference in circumferential speed as described above is small, and when the circumferential speeds of the rollers R1, R2 and R3 are made V1, V2, and V3, they may be about V1:V2:V3=4:5:6 in the case of the forward step, while reversed values thereof in the case of the backward step.

The hot press device of the present invention having the reciprocating function of the present invention can be used not only for lamination treatment by use of a print protective member of the transfer peel-off type as described above, but also for various treatments in which sheet-shaped products are subjected to hot press.

As described above, according to the present invention, since the circumferential speed of rollers made greater sequentially in the passing direction of the treatment object having members with different thermal shrinkages laminated on one another, the treatment object receives constant tension, whereby no curl or wrinkle is generated, and no such inconvenience such as jamming occurs in the device.

When a peel-off transfer type lamination film is used, by provision of a plural number of heating steps in the lamination treatment step, adhesion of the lamination film to the print can be improved at lower temperature, and also the base film of the lamination film can be peeled off from the print with extreme ease.

Further, since the paper feeding inlet and discharging outlet are made the same, there are the advantages that the main device is made compact to be free from restriction in the installation place, and also that operation is simple and easy because the treatment object is returned back automatically to the insertion inlet.

What is claimed is:

1. A hot press device comprising;
    a rotatable pair of hot press rollers;
    a built-in heater provided in at least one of said hot press rollers;
    a first pair of delivery rollers provided on one side of said hot press rollers along a feeding path, and a second pair of delivery rollers provided on the other side of said hot press rollers along the feeding path, for heat-treating an object by feeding the object in a first direction along the feeding path and through said first pair of delivery rollers to said hot press rollers;
    a first sensor for detecting the position of the object passing therethrough;
    a second sensor for detecting the position of the object having been heat-treated, and
    control means for controlling rotation of said second pair of delivery rollers so as to increase circumferential speed thereof in accordance with information on the position of the object detected by said first sensor, and for reversing the feeding direction to a second feeding direction opposite to the first feeding direction, and for controlling the rotation of said first pair of delivery rollers to increase the circumferential speed thereof in accordance with information on the position of the object detected by said second sensor.

2. A hot press device according to claim 1, wherein the treatment object is a laminated product of a print with a lamination film.

3. A hot press device according to claim 2, wherein the lamination film comprises a substrate and a transfer sheet provided peelably on the substrate.

4. A process for hot pressure adhesion treatment of an object comprising members having different thermal expansion coefficients, having the steps of:
    passing the object along one path in an insertion direction through a pair of hot rollers having a built-in heater in at least one of the rollers;
    applying pressure as the object passes through the hot rollers;
    reversing rotation of the pair of hot rollers to pass the object through the pair of hot rollers in a reverse direction along the same path; and
    applying pressure as the object passes through the hot rollers in the reverse direction.

5. A process for hot pressure adhesion treatment according to claim 4, wherein said treatment object is formed by superposing a lamination film on a print.

6. A process for hot pressure adhesion treatment according to claim 5, wherein said lamination film comprises a substrate and a transfer layer provided peelably on said substrate.

7. A lamination apparatus, comprising:
    rotatable pair of hot press rollers for heating pressing a treatment object therebetween while rotating;
    first and second pairs of rotatable delivery rollers arranged before and after, respectively, said rotatable pair of hot press rollers;
    means for rotating said rotatable pair of hot press rollers and said first and second pairs of rotatable delivery rollers in a first direction to deliver said treatment object along one path through said pair of hot press rollers;
    means for rotating said rotatable pair of hot press rollers and said first and second pairs of rotatable delivery rollers in a second direction to deliver said treatment object along the same path through said pair of hot press rollers; and
    means for controlling said first and second pairs of delivery rollers so that circumferential speeds of the respective delivery rollers disposed in a downstream position in first and second directions may be increased.

8. A lamination process for treatment of an object comprising members having different thermal expansion coefficients, having the steps of:
    passing the object along one path in an insertion direction through a pair of hot rollers having a built-in heater in at least one of the rollers;
    applying pressure as the object passes through the hot rollers;
    reversing rotation of the pair of hot rollers to pass the object through the pair of hot rollers in a reverse direction along the same path; and
    applying pressure as the object passes through the hot rollers in the reverse direction.

* * * * *

UNITED STATES PATENT AND TRADEMARK OFFICE
CERTIFICATE OF CORRECTION

PATENT NO. : 4,865,675

DATED : September 12, 1989

INVENTOR(S) : Mayumi Yamamoto, et al.

It is certified that error appears in the above-identified patent and that said Letters Patent is hereby corrected as shown below:

COLUMN 1:

Line 13, "example" should read --example,--.

Line 49, "mult-color" should read --multi-color--.

COLUMN 2:

Line 11, "tion done in a stable manner." should read --tion--.

COLUMN 3:

Line 18, "back by" should read --back to hands by--.

Line 30, "opposite" (second occurrence) should read be deleted.

COLUMN 4:

Line 66, "controlls" should read --controls--.

COLUMN 5:

Line 2, "constantly" should read --constant--.

Line 7, "circiumferential" should read --circumferential--.

Line 29, "made" should read --is made--.

UNITED STATES PATENT AND TRADEMARK OFFICE
CERTIFICATE OF CORRECTION

PATENT NO. : 4,865,675

DATED : September 12, 1989

INVENTOR(S) : Mayumi Yamamoto, et al.

It is certified that error appears in the above-identified patent and that said Letters Patent is hereby corrected as shown below:

COLUMN 6:

Line 35, "rotatable pair" should read --a rotatable pair-- and "heating pressing" should read --heating and pressing--.

Signed and Sealed this

Eleventh Day of December, 1990

Attest:

HARRY F. MANBECK, JR.

Attesting Officer

Commissioner of Patents and Trademarks